Figure 1:
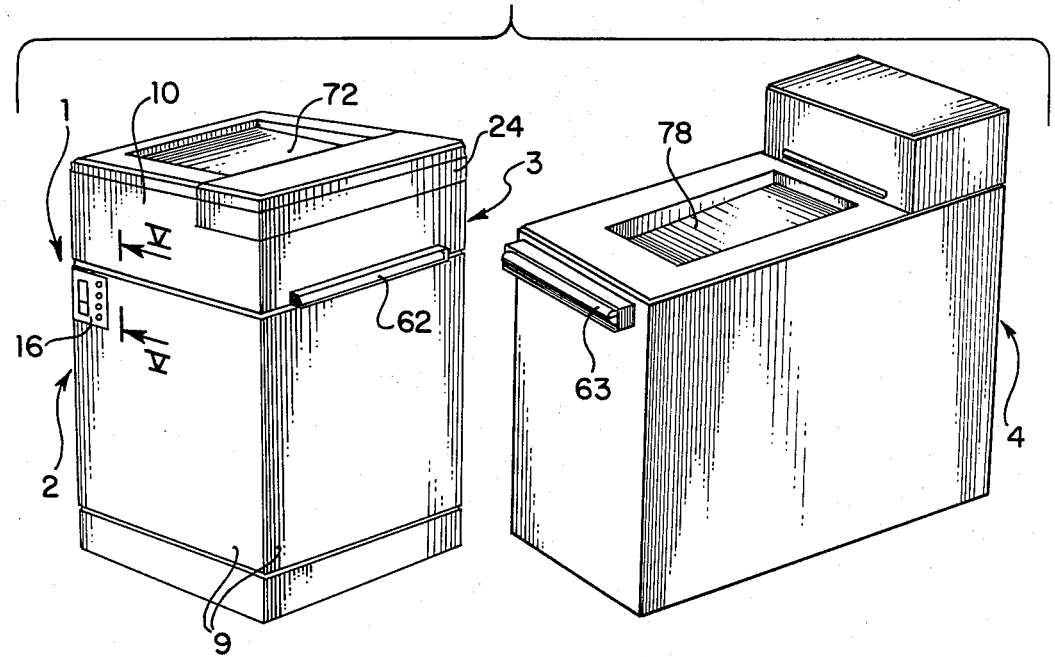

United States Patent [19]
Gandolfo et al.

[11] Patent Number: 4,835,557
[45] Date of Patent: May 30, 1989

[54] APPARATUS FOR THE DAYLIGHT TRANSFER OF A VIDEO IMAGE ONTO A PHOTOSENSITIVE FILM

[75] Inventors: Rino Gandolfo; Renato Bolognese, both of Savona, Italy

[73] Assignee: Minnesota Mining and Manufacturing Company, St. Paul, Minn.

[21] Appl. No.: 62,102

[22] Filed: Jun. 11, 1987

[30] Foreign Application Priority Data

Jun. 12, 1986 [IT] Italy .............................. 20770 A/86

[51] Int. Cl.$^4$ ............................................. G03B 29/00
[52] U.S. Cl. ........................................ 354/76; 355/20; 355/27; 346/110 R; 358/244
[58] Field of Search ..................... 354/76; 355/20, 27, 355/64, 65, 66; 346/110 R; 358/244

[56] References Cited

U.S. PATENT DOCUMENTS

| | | | |
|---|---|---|---|
| 3,640,198 | 2/1972 | James | 355/20 |
| 3,673,936 | 7/1972 | Stone et al. | 355/20 |
| 3,743,412 | 7/1973 | Morse | 346/110 R |
| 4,343,543 | 8/1982 | Schiff et al. | 346/110 R |
| 4,615,596 | 10/1986 | Muller et al. | 354/76 |
| 4,629,300 | 12/1986 | Akimoto et al. | 354/76 |

*Primary Examiner*—A. A. Mathews
*Attorney, Agent, or Firm*—Donald M. Sell; Walter N. Kirn; Mark A. Litman

[57] ABSTRACT

Automatic apparatus for the transfer in daylight of a video image onto a discrete or continuous sheet of photosensitive film contained in a loading unit. The apparatus comprises a base unit containing televisual display means and a handling and exposure unit. First peripheral abutment means are associated with said units and front, rear and side outer panel members are provided with second abutment means, the light-tight combination of said first and second abutment means associated with said panel members providing light protecting means for the two units.

11 Claims, 7 Drawing Sheets

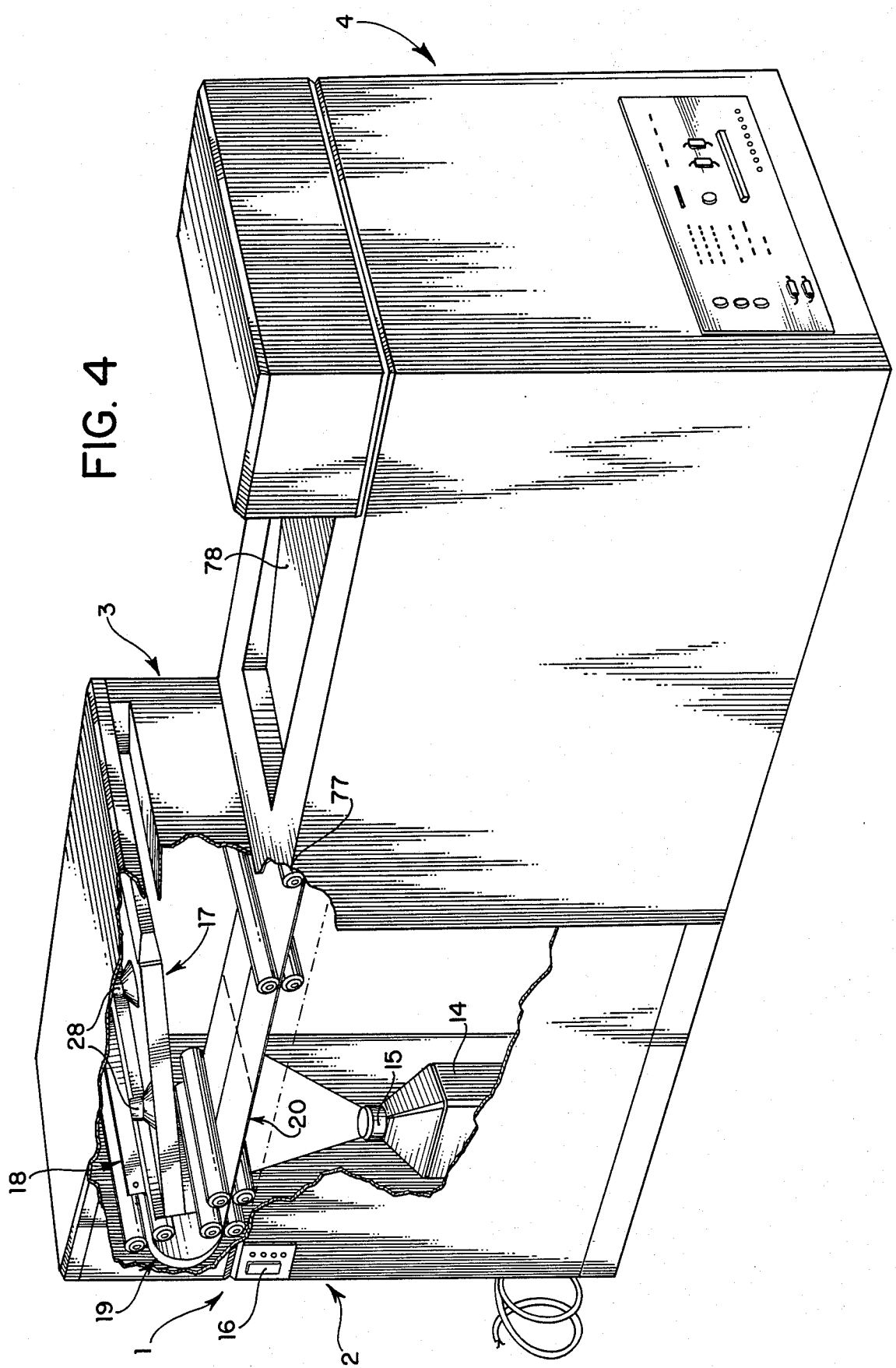

APPARATUS FOR THE DAYLIGHT TRANSFER OF A VIDEO IMAGE ONTO A PHOTOSENSITIVE FILM

The present invention relates in general to apparatus for the automatic treatment in daylight of photosensitive films.

More particularly, the invention relates to apparatus for the transfer in daylight of a video image onto a photosensitive film contained in a loading unit, comprising televisual display means, receiving and handling means for the photosensitive film, means defining an exposure station for the exposure of the photosensitive film by the televisual display means, and conveyor means for transferring the photosensitive film from the receiving and handling means to the exposure station.

Photosensitive films currently available and used in techniques for the transfer of video images in daylight may be of the discrete-sheet or continuous-sheet type. For their handling by apparatus for transferring video images, discrete sheets of film are inserted in loading units of the cassette type for single sheets or of the magazine-loader type for several sheets, while roller loading units are used for continuous film strips.

Apparatus for the transfer in daylight of video images onto photosensitive films which are currently available on the market are specifically conceived and constructed to operate solely with photosensitive films in single discrete sheets, in several discrete sheets, or in continuous strips. This is problematical and inconvenient for users who, in order to ensure that they can operate both with single or multiple discrete sheets of film and with continuous film strips, are forced to acquire the various corresponding specific pieces of apparatus, and also for the manufacturers of the apparatus who must necessarily provide different production and assembly lines with the burdens resulting therefrom.

The object of the present invention is to avoid these disadvantages and to provide apparatus for the transfer in daylight of video images onto photosensitive films of the type specified above, which apparatus is able to ensure both greater productional rationalization and greater flexibility in use.

Another object of the invention is to provide apparatus for the transfer in daylight of video images onto photosensitive films arranged so that it can operate with the minimum changes, and in any case without excessive constructional complications for the manufacturer, both with photosensitive films in single or multiple discrete sheets and with continuous strips of photosensitive film.

A further object of the invention is to provide apparatus for the transfer in daylight of video images onto photosensitive films, the apparatus having a compact and practical structure which can easily be assembled and disassembled.

Another object of the invention is to provide automatic apparatus for the transfer in daylight of video images onto photosensitive film which apparatus is precise, safe and reliable in operation, both with regard to the transfer operation of the video images and with regard to the subsequent development of the exposed film.

In order to achieve theses objects, the invention provides apparatus for transfer in daylight of a video image onto a discrete or continuous sheet of photosensitive film, of the type specified at the beginning, characterized in that it comprises:

(a) a base unit containing the televisual visual display means (e.g. cathode ray tube) and having an open upper wall through which the video image to be transferred onto the photosensitive film is projected towards a horizontal focal plane of exposure, (b) a handling and exposure unit applied to the upper open wall of the base unit with a light-tight seal and carrying the receiving means and handling means, the exposure station and the conveyor means, the base unit and the handling and exposure unit being shaped essentially as open parallelepipeds and constituting two structurally distinct units which are independent of each other and connected together in a horizontal plane, (c) first peripheral abutment means associated with the units in correspondence with the respective outer lateral surfaces in the zone of the horizontal plane of connection, (d) front, rear and side outer panel members provided with second abutment means, the light-tight combination of said first and second abutment means, associated with said panel members, providing light protecting means for the two units.

By virtue of this solution, the apparatus according to the invention may be easily adapted by the manufacturer to the requirements of the user since, the conformation of the base units remaining the same, the machine can be easily arranged for use with single or multiple discrete sheets of photosensitive film or with continuous strips of photosensitive film by the provision of corresponding handling and exposure units which are interchangeable and can be applied selectively to the base unit as required, in a quick and easy manner. Such interchangeable handling and exposure units conveniently have a generally common shape and, in practice, differ from each other solely with regard to the configuration of the receiving and handling means for the photosensitive film in single or multiple discrete sheets or in continuous strips.

In other words, apparatus for the transfer in daylight of video images onto discrete or continuous sheets of photosensitive film is provided which has a modular structure easily adaptable by the manufacturer to the specific requirements of the user.

According to the invention, the first abutment means comprise a channel-profiled peripheral member having its channel facing outwardly and defining two horizontal abutment edges, upper and lower respectively, defining the horizontal plane of connection between the two units, and the outer panel members include horizontal edges for complementary engagement in the channel of the channel-profiled member.

This conformation ensures that the apparatus can be fitted together conveniently and easily during its assembly.

The handling and exposure unit of the apparatus conveniently comprises a receiving module for the photosensitive film including a film take-up unit, a film conveyor module, a film exposure module including a horizontal exposure plane facing the base unit and supplied by the conveyor module, the exposure plane defining the said focal plane and vacuum means for retaining the film in the exposure plane.

It advantageous for the handling and exposure unit to incorporate a dry development module for the exposed film, which can be fed from the exposure module, and a module for discharging the exposed film from the handling and exposure unit, which discharge module is operatively associated with the dry development module.

The apparatus according to the invention may further include a wet development structural unit, placed beside the base unit, for developing the exposed photosensitive film. The wet development unit is light-tight coupled to the side of the handling and exposure unit and can be fed selectively from the exposure module. Preferably, the handling and exposure unit and the wet development unit have respective outlet and inlet means, which may be lighttight coupled, constituting light-tight conveying means for the film from exposure module of the handling and exposure unit to a conveyor module of the wet development unit. The wet development unit may be used instead of the dry development module of the handling and exposure unit or may be combined with the latter, according to the requirements of the user, to further improve the flexibility of use of the apparatus. In the second case, deflector means are provided at the output of the exposure module to direct the exposed film selectively towards the dry development module of the handling and exposure unit or towards the wet development unit.

Figure 3:
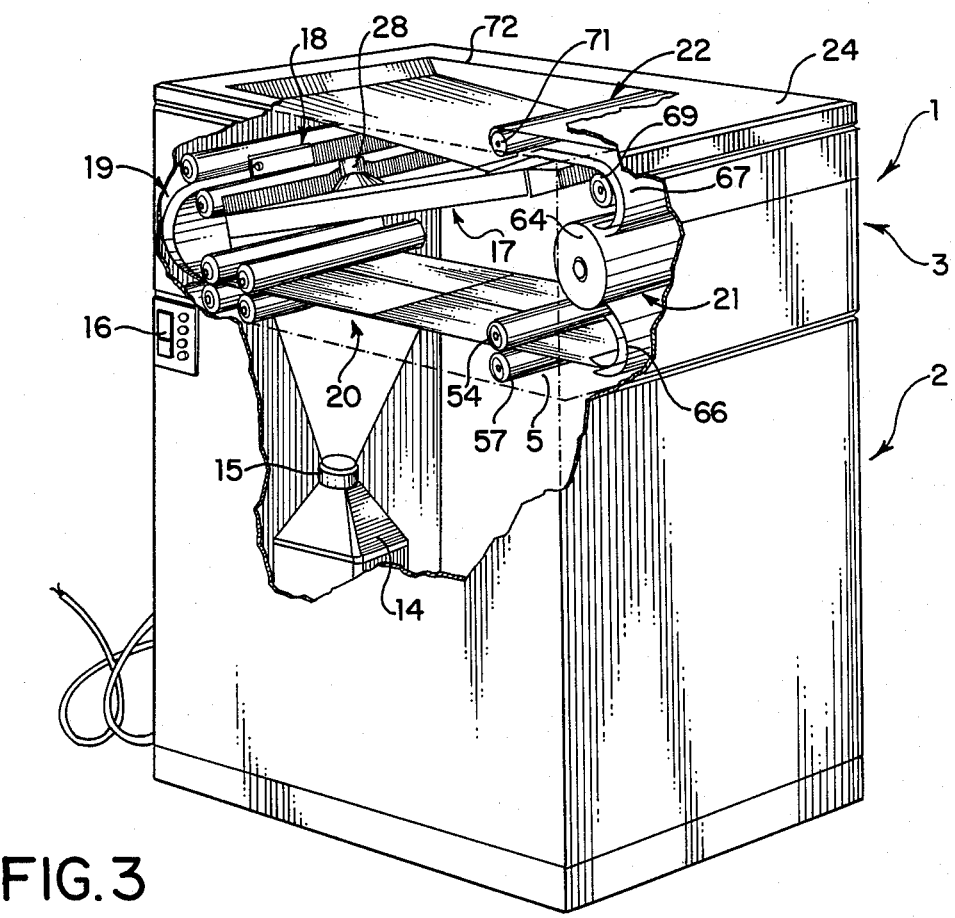
Figure 2:
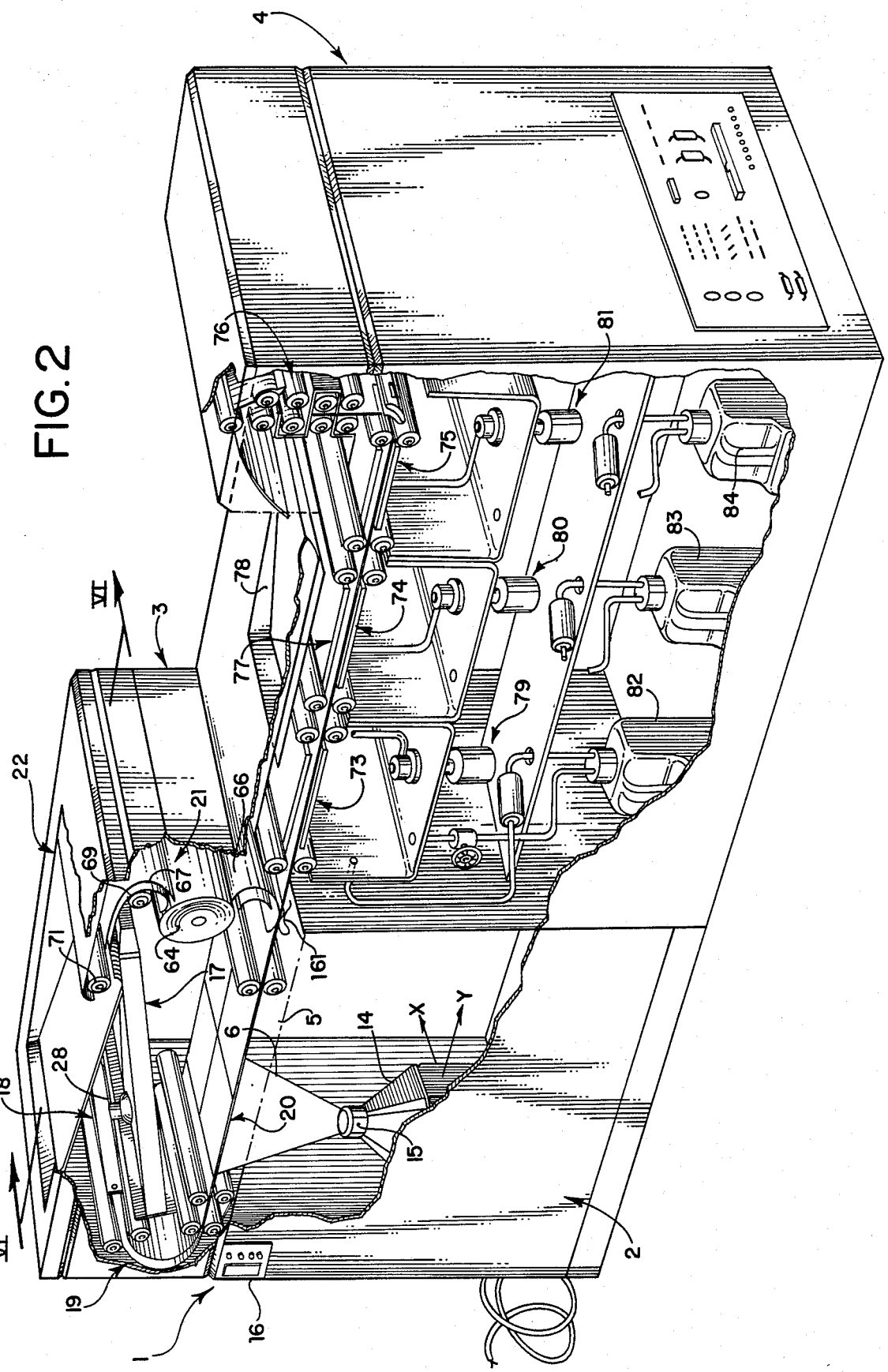
Figure 7:
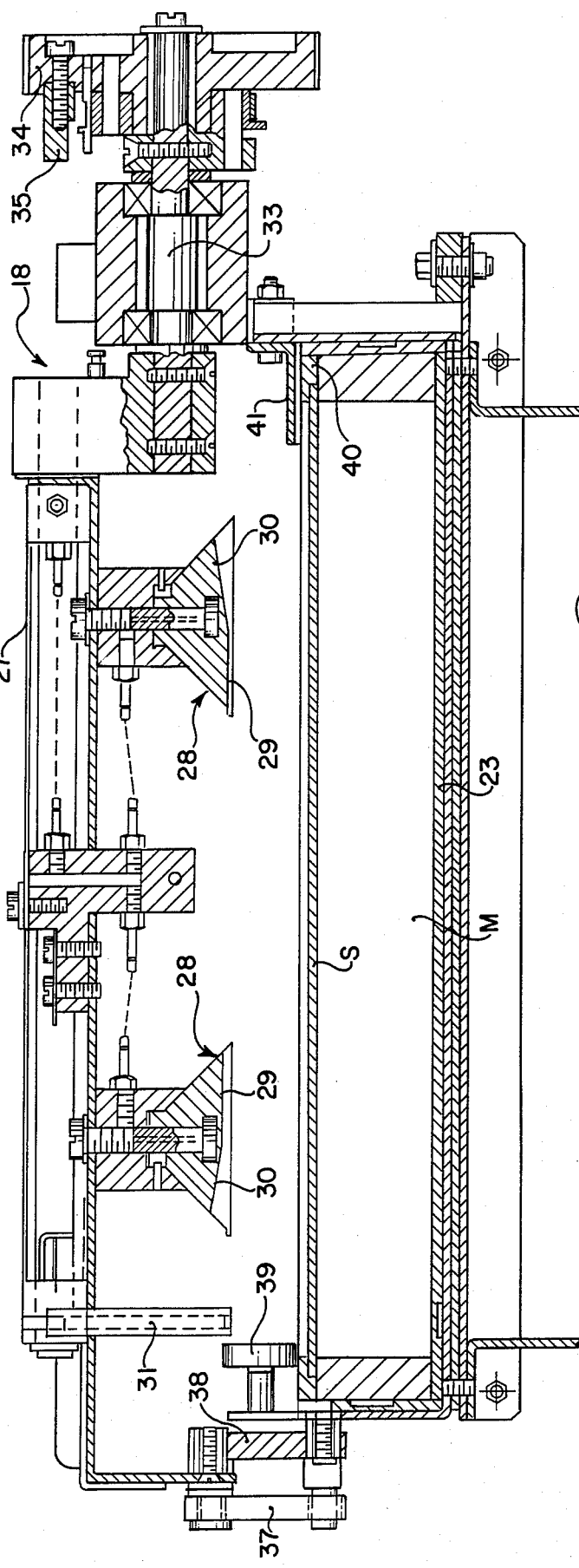
Figure 10:
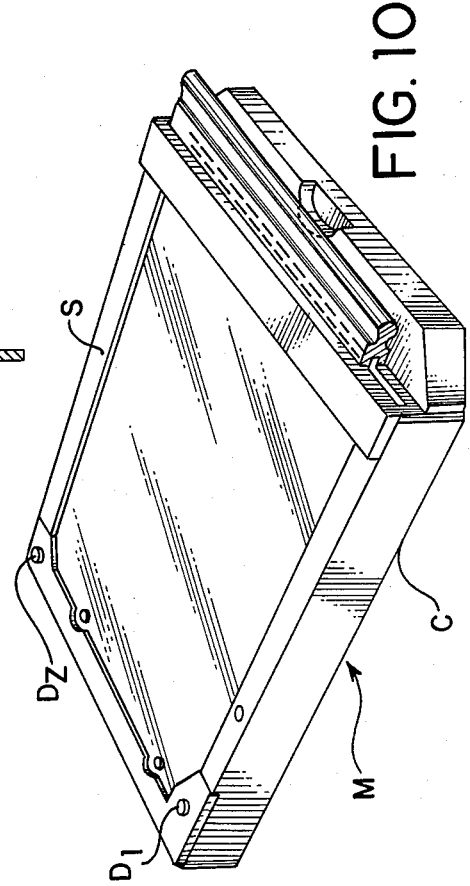
Figure 5:
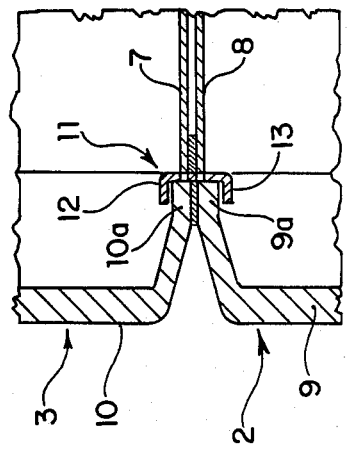
Figure 6:
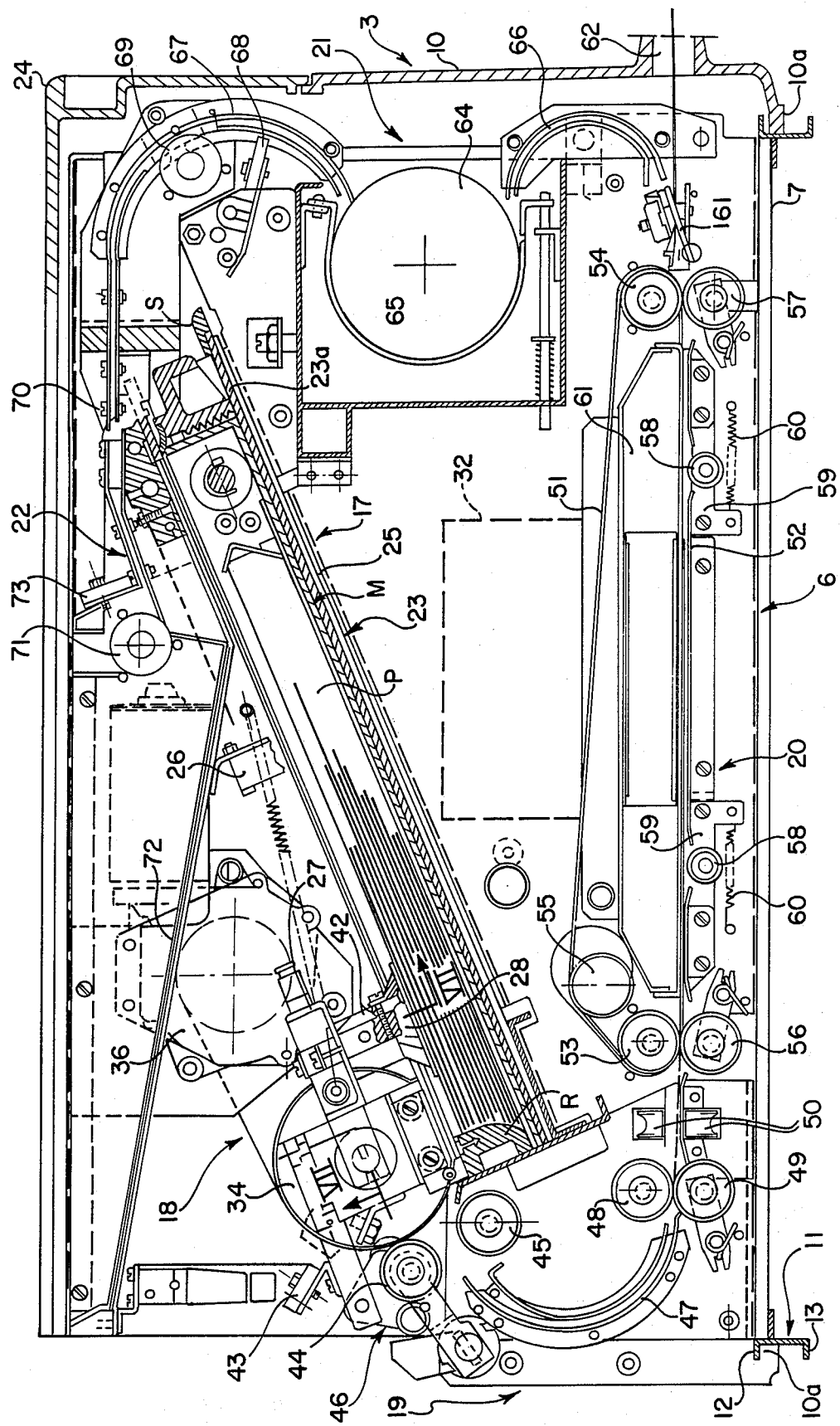
Figure 8:
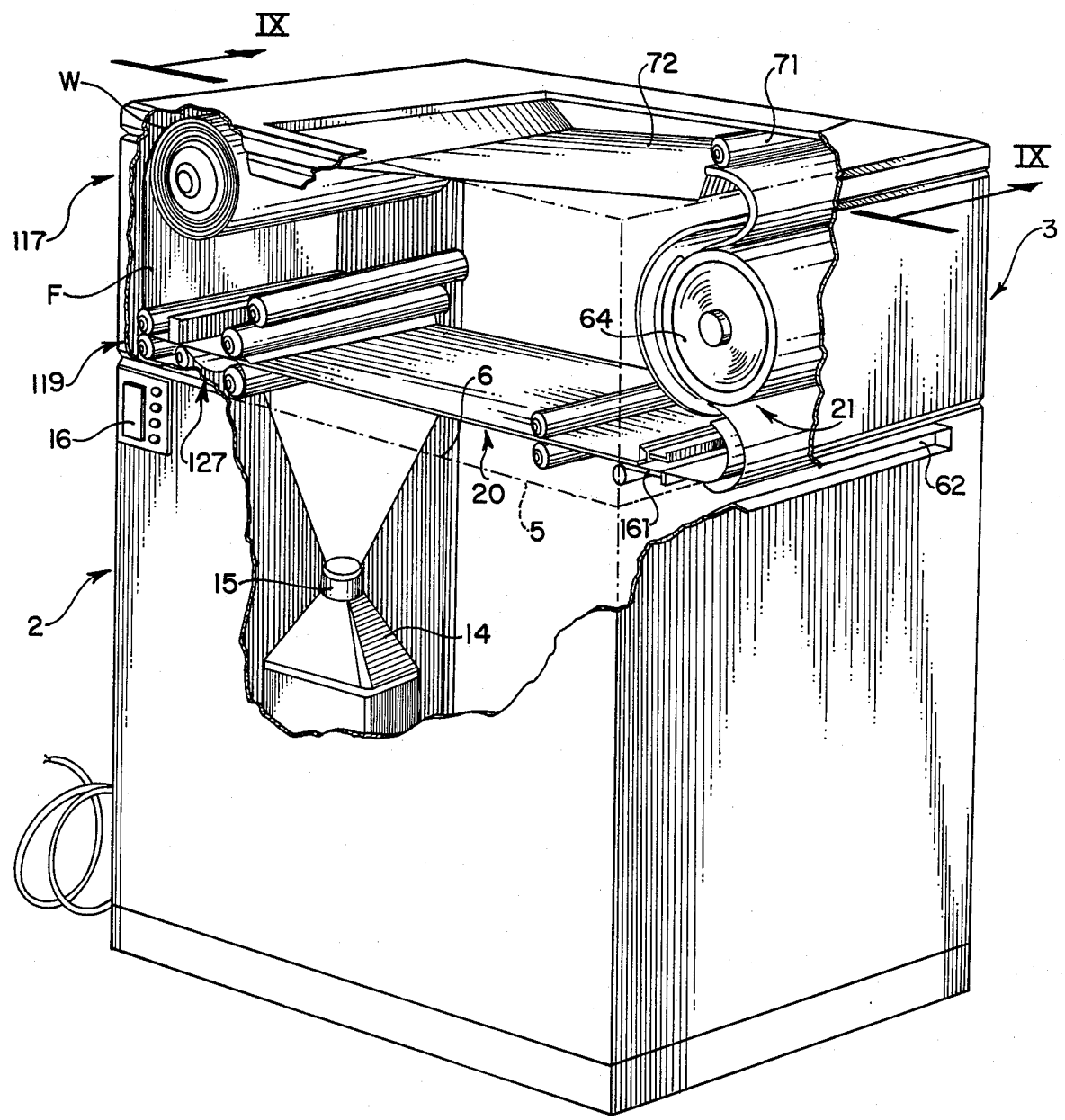
Figure 9:
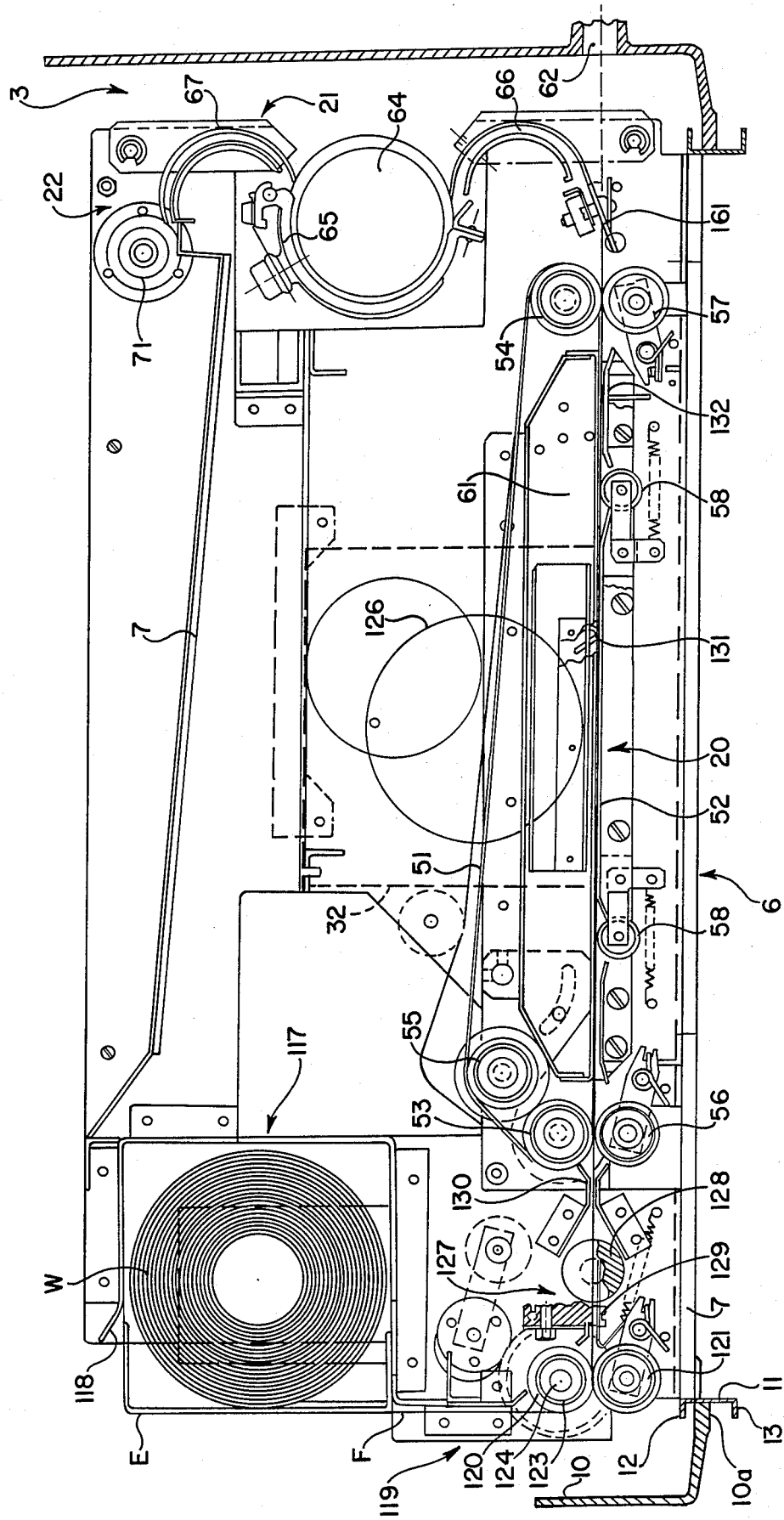

Further characteristics and advantages of the invention will become clear during the course of the detailed description which follows with reference to the appended drawings, provided purely by way of non-limiting example, in which:

FIG. 1 is a partially-exploded perspective view of apparatus for the transfer in daylight of a video image onto a photosensitive film according to c "complete" configuration of the apparatus, FIG. 2 is a partially-sectioned diagrammatic perspective view of FIG. 1, FIG. 3 is a partially-sectioned diagrammatic perspective view of the apparatus according to a first "partial" configuration, FIG. 4 is a partially-sectioned diagrammatic perspective view of the apparatus according to a second "partial" configuration, FIG. 5 is a schematic cross-sectional view on an enlarged scale, taken on the line V—V of FIG. 1, FIG. 6 is a horizontal section on an enlarged scale, taken on the line VI—VI of FIG. 2, FIG. 7 is a sectional view on an enlarged scale, taken on the line VII—VII of FIG. 6, FIG. 8 is a partially-sectioned diagrammatic perspective view of the apparatus according to a third "partial" configuration, FIG. 9 is a horizontal section on an enlarged scale, taken on the line IX—IX of FIG. 8, and FIG. 10 is a schematic perspective view of a magazine-loader for sheets of photosensitive film usable with the apparatus illustrated in FIGS. 1 to 7.

It must be noted by way of introduction that the apparatus according to the invention, which will be described below, can be arranged in various embodiments depending on its intended use, that is, for use with photosensitive films in multiple discrete sheets, photosensitive films in single discrete sheets and photosensitive films in continuous strips, respectively. Moreover, as will be seen, in each of the three solutions, the machine can be arranged in three different embodiments in dependence on the requirements relating to tha manner of development of the exposed films, of which the first will be termed "complete" below and the second and third "partial".

With reference initially to FIGS. 1 and 2, the "complete" configuration of the apparatus will be described in the version intended for use with multiple discrete sheets of photosensitive film.

According to this configuration, the apparatus includes essentially a main unit, generally indicated 1, constituted by a base structural unit 2 to the top of which is fitted a handling and exposure structural unit 3, and a secondary development unit 4 applied to one side of the main unit 1 in the manner explained below. In order to reduce the bulk of the apparatus, units 1 and 4 may conveniently have a shape which allows them to be placed side by side, one against the other along respective parallel faces. Preferably, each of such units has a generally parallelepipedal shape, more preferably with faces substantially normal to each other. The expression "generally parallelepipedal", as used herein, is intended to cover units whose corners do not necessarily form right angles or do not include any angles if rounded corners are used. Such expression is intended to include also trapezoidal shapes in which two faces are not parallel with another. In case of a trapezoidal shape, the minor face of the two parallel faces having different lengths will have a length substantially higher than zero, such as, for example, at least twenty percent of the length of the major face, preferably at least fifty percent. The base unit 2 acts as a support for the exposure and handling unit 3 and has an open upper wall 5 which is coincident with a lower open wall 6 of the unit 3 and defines a horizontal plane of mutual connection. This connection shown in greater detail in FIG. 5, is achieved by the simple resting of a lower structural frame 7 of the unit 3, defining the lower open wall 6, on an upper structural frame 8 of the base unit 1, defining the open upper wall 5 thereof. The light-tight sealing of the mechanical fixing between the two units 2 and 3 is achieved by lateral covers of plastics material forming external panelling applied to the support structure of these units. In effect, the units 2 and 3 each have four peripheral panels 9, 10, front, rear and lateral respectively, which have a channel section wit the channel facing inwardly and longitudinal horizontal edges, upper 9a and lower 10a respectively, engaged within the cavities of a channel-profiled peripheral member 11 fixed rigidly to the frame 7 of the unit 3 with its channel facing outwardly and defined by respective upper and lower horizontal walls 12 and 13. Each panel 9 of the base unit 2 has its upper edge 9a inserted in the lower zone of the channel of the corresponding side of the profile 11, and each panel 10 has its lower edge 10a inserted in the upper zone of this channel. The panels 9 and the panels 10 are interconnected so as to enable them to be taken apart easily and quickly, for example by means of internal screw retaining members, not illustrated in the drawings.

The base unit 2, as well as acting as a support base for the handling and exposure unit 3, houses a video module for generating images intended to be transferred in daylight to photosensitive films within the unit 3, in the manner explained below. The video module comprises, in a generally known manner, a television monitor 14 oriented so as to direct video images upwardly, that is, towards the horizontal plane of connection 5-6 between the two units 2 and 3, through an optical focusing system, generally indicated 15. This video module also includes a supply system for the monitor 14 and an electronic control unit including a unit which contains a video actuation and management card and a connection panel (not illustrated in the drawings), as well as an external control panel 16. This electronic unit is also operatively interconnected with an electronic control module with which the unit 3 is provided and the characteristics of which will be described below.

The television monitor 14 may also be provided, in generally known manner, with a system for movement along a horizontal axis X or along two horizontal axes X-Y perpendicular to each other, in order to allow the transfer of a plurality of video images, for example four or six, onto the same photosensitive film. For the sake of brevity, this movement system will not be described in that it is generally known in itself in conventional apparatus for the transfer of video images onto photosensitive films.

The conformation of the base unit 2 is the same for all the aforementioned possible configurations of the apparatus according to the invention. As stated above, these configurations vary from each other in the different conformations of the unit 3 and in the presence or absence of the secondary unit 4.

In the complete configuration for multiple discrete sheets of photosensitive film, illustrated in FIGS. 1, 2, 6 and 7, this unit 3 is arranged to operate with a magazine-loader, indicated M in FIGS. 6 and 10, containing a pack P of radiographic films of a predetermined format, for example 8"×10", usually of three different types made and sold by the Applicants under the marks CRT - DRY SILVER - DRY SILVER TRASPARENT. The magazine-loader M is of the type constituting the subject of the copending Italian Patent Application no. 20769 A/86 in the name of the same Applicant, and will not therefore be described in detail. For the purposes of the invention, it suffices to say that it includes a cassette C of the type which is closed by a sliding lid S and defines within it a receptacle defined by stops which can be moved together to position and center the films P precisely. The front stop, indicated R in FIG. 6, has a convex configuration with a cylindrical surface.

The magazine-loader M also has a system for driving the advance movement of the stops and hence for keeping the pack of radiographic films P in engagement with the front stop R, as well as a retaining device $D_1$ for preventing the sliding lid S from being removed, and a locking device $D_2$ for retaining the magazine-loader M within the unit 3 when the sliding lid S is removed.

The handling and exposure unit 3 of the version of the apparatus shown in FIGS. 1, 2, 6 and 7 essentially comprises the following components:

a receiving module 17 for the magazine-loader M,
a take-up unit 18 for taking the films P from the magazine-loader M,
a conveyor module 19 for the films P,
an exposure module 20 for the films P,
a dry development module 21 for the films P, and
an output module 22 for the films P.

With reference now to FIGS. 6 and 7 in greater detail, the receiving module 17 comprises a tray-like receptacle 23, which is inclined downwardly and upwardly open, having an input side 23a accessible from the exterior by the opening of a hinged door 24 to allow the insertion and removal of the magazine-loader M. The tray 23 has a fixed stop, not illustrated in the drawings, on its side opposite the open wall 23a for controlling the approach movement of the stops within the magazine-loader M as a result of its introduction into the receptacle 23, in the manner known from the aforesaid copending Italian Patent Application no. 20769 A/86 Furthermore, the bottom of the tray receptacle 23 has a space 25 for housing the sliding lid S upon its removal from the magazine-loader M when the latter is inserted in the housing 23.

It should also be noted that the receiving module 17, the take-up unit 18, the conveyor module 19, and the dry development module 21 are preassembled units fixed within the unit 3 in a rapidly releasable manner by means of screw or like retaining means, not illustrated in the drawings.

Above the tray receptacle 23 is a photocell sensor 26 for signalling the opening of the magazine-loader M and hence the presence of films P within it.

The take-up unit 18, illustrated in greater detail in FIG. 7, comprises a supporting cross member 27 extending above the lower zone of the tray housing 23 and carrying a pair of suction cups 28 connected to a vacuum source housed in the unit 3 and constituted by an aspirator-compressor unit 32, schematically indicated. The two suction cups 28 have respective internal rigid parts 29 for bearing against the films P and having divergent surfaces 30 for arching or bowing the film taken up during the take-up phase described below.

On one side, the cross member 27 also carries a nozzle 31 which is connected to a pressurized-air source forming part of the aspirator-compressor unit 32 and through which a jet of air is directed substantially tangentially to the suction cups 28 during the take-up operation.

The cross member 27 is articulated eccentrically on one side about a pin 33 carried by a side of the tray 23, a toothed pulley 34 being associated with the pin and carrying a cam member 35 which can be rotated by means of an electric motor 36. On its opposite side, the cross member 27 is connected to the tray 23 by an articulated-parallelogram mechanism formed by a pair of connecting rods 37, 38 by means of which the rotation imparted to the toothed pulley 34 is translated into a movement of the cross member 27 and hence of the two suction cups 28 in a circular-arc path having a radius of curvature substantially corresponding to that of the front stop R of the magazine-loader M. The suction cups 28 are movable along this path between an advanced, lowered take-up position for the films P, illustrated in FIG. 6, and a withdrawn, raised released position, illustrated in FIG. 7.

Two stops 39, 40, shown in the same Figure, are supported within the tray 23 and are constituted respectively by an idle roller and a plate with a recess 41, which cooperate respectively with the retaining device $D_1$ and a locking device $D_2$ for the magazine-loader M during insertion of the magazine-loader M into the tray 23. In effect, the roller 39 causes the disengagement of the retaining device $D_1$ so as to allow the lid S to be removed, and the plate 40 allows the magazine-loader M to be anchored in the tray 23 as a result of the engagement of the locking device $D_2$ following the removal of the lid S. The manner of operation of the two devices $D_1$, $D_2$ is described in detail in the aforesaid copending Patent Application No. 20769 A/86 in the name of the Applicant.

The take-up unit 18 has two associated photocell sensors 42, 43 for indicating respectively the effective take-up of a film P by the two suction cups 28 from the advanced lowered position to the raised withdrawn position by means of the cam member 35 of the toothed pulley 34, and a control device 46, generally indicated in FIG. 6. The reapproach of the two rollers 44 and 45 is effected after the positioning of the two suction cups 28 in their withdrawn raised position, so as to grip the film P taken up.

The conveyor module 19 also includes a semi-circular guide member 47 located between the two rollers 44, 45 and a second pair of lower rollers 48, 49 of which the first is also driven by the motor 36 located in correspondence with the input of the exposure module 20. Immediately downstream of the two output rollers 48, 49 is a photocell sensor 50 for checking the presence of a single film and actuating the exposure module 20.

Still with reference to FIG. 6, the exposure module 20 includes a device for positioning the films P coming from the conveyor module 19 and includes a pair of endless belt conveyors, only one of which is indicated at 51 in FIG. 6, formed by two movable lateral belts associated with a horizontal perforated plate 52 which, in practice, defines the focal plane of exposure of the images generated by the television monitor 14 in the base unit 2. The lower passes of the two belts 51 are movable against the sides of the lower face of the perforated plate 52 and pass over three rollers, respectively an input roller 53, an output roller 54, and a tensioning and drive roller 55, rotated by the motor 36 through conventional transmission systems, not illustrated. The rollers 53 and 54 have associated respective lower presser rollers 56 and 57.

Beneath the passes of the two belts 51 adjacent the perforated plate 52 and in correspondence with the inner margins thereof are two pairs of idle film-support rollers 52 having respective axes inclined to the horizontal and diverging upwardly so as to impart an outward drawing action of the film located in correspondence with the exposure module 20. The rollers 58 are carried by respective rocker arms 59 biassed upwardly by tension springs 60 associated therewith.

The perforated plate 52 constitutes the bottom of a suction chamber 61 connected to the suction section of the aspirator-compressor unit 32.

The exposure module 20 also includes sensor members, not illustrated in the drawing, located along the path of advance of the film and arranged to stop the movement of the belts 51 in the position of correct centering and positioning of the film at the focal plane defined by the perforated plate 52.

Immediately downstream of the two output rollers 54 and 57 of the exposure module 20 is an electromagnetic deflector unit 161 which is selectively operable to direct the films output by the exposure module 20 upwardly towards the dry development module 21 or horizontally towards an outlet 62 projecting from one of the side panels 10 of the unit 3. This outlet 62 is arranged to be coupled with a light-tight seal to a corresponding inlet 63 with which the auxiliary wet development unit 4 is provided. In practice, then, the deflector device 161 enables the exposed films to be directed either to the dry developer 21 or to the wet developer 4.

The dry developer 21 is of generally known type in that it has been made and sold for some time. In short, it comprises an independently-driven roller 64 cooperating with a resistive heating unit 65 and is fed by the exposure module 20 through the deflector 161 by means of a substantially semi-circular guide member 66.

The roller 64 is rotated at a slightly higher speed (for example 10%) than the speed of rotation of the output rollers 54 and 7 of the exposure module 20 and feeds a semi-circular guide member 67 forming part of the output module 22. The guide member 67 has an associated photocell sensor 68 for detecting the presence of film and a motordriven drive roller 69 with a soft surface driven at a slightly higher speed of rotation (for example 10% greater) than that of the roller 64. The output module 22 also includes a further guide member 70 which feeds, by means of a final motor-driven roller driven at a slightly higher speed of rotation (for example 10% greater) than that of the roller 69, a collecting tray 72 located at the top of the exposure and handling unit 3. The final roller 71 has a further associated photocell sensor 73 for detecting the passage of the films and stopping the operative cycle of the apparatus.

The various photocell sensors described above, as well as the electric and electro-pneumatic components (associated with the aspirator-compressor unit 32) of the unit 3 are connected to an electronic processing and control units with a microprocessor, not illustrated, which is operatively connected to the electronic control equipment of the base unit 2 for controlling the video parameters and operating the handling members for the films to effect a programmed operating cycle in dependence on the characteristics thereof.

The handling and exposure unit 3 operates as follows.

After the magazine-loader M has been introduced into the tray receptacle 23 through the openable door 24, the slidable lid 7 is removed and the door 24 is closed to enable the apparatus to be activated through a magnetic switch of conventional type, not illustrated. As a result of the removal of the lid S, it is possible, by virtue of the cooperation between the roller 39 and the retaining device $D_1$, to lock the magazine-loader M in the tray 23 by the cooperation between the locking device $D_2$ and the plate 40, as stated above.

Following these operations, an optical sensor, not illustrated, supplies the microprocessor unit with signals indicative of the characteristics of the films P shown by means of a conventional bar code with which the magazine-loader M is usually provided. These signals are processed so that the operating cycle of the unit 3 is adapted to the type of film P present in the magazine-loader M. In particular, the microprocessor controls the following operations:

it indicates the presence of the magazine M, it arranges the take-up speed for the films P, it arranges the exposure time to the images generated by the television monitor 14, it selects the type of developer (dry 21 or wet 4), it arranges the temperature of the dry developer, it arranges the group of channels (luminosity contrast, gamma) of the television monitor 14, it arranges the level of sensitivity of the sensor 50.

At this point, the cycle proper starts and provides initially for the activation of the take-up unit 18 whereby the suction cups 28 take-up a film P by suction, withdraw it from the magazine-loader M and deliver to the two rollers 44 and 45 for transfer to the conveyor module 19. The take-up of the film P is facilitated by the diverging conformation of the abutment surfaces 29 of the suction cups 28, the arched conformation of the frontal stop R of the magazine-loader M, and the action of the pressurized air supply nozzle 31. The combined effect of these elements facilitates the efficient detachment of the film P from the contiguous ones, preventing these from being taken up by adhesion.

The film P taken up is then transferred by the conveyor module 19 to the exposure module 20 where the film P is retained by suction against the perforated plate 52. After exposure to the video image generated by the television monitor 14, the film is discharged from the exposure module 20 and is passed through the deflector 161 to the dry developer 21 or the wet developer 4.

In the first case, the exposed film passes through the dry exposure module and finally through the output module 22 to the tray 72 from which it can be removed. During the development and discharge phase, the film is kept under tension by the differentiated speeds of the rollers 54 and 57, 64, 69 and 71.

At the end of the cycle, the photocell 73 feeds the microprocessor control unit with an enabling signal to start a new cycle.

When the film is to be wet-developed, it is directed by the deflector 161 to the outlet 62 after exposure and passes through the inlet 63 to the wet development unit 4.

The outlet 62 of the handling and exposure unit 3 and the inlet 63 of the wet development unit 4 are light-tight coupled. Preferably, the outlet 62 and the inlet 63 are provided on respective side walls of the unit and have a shape which allows the units to be placed side by side when the outlet 62 and the inlet 63 are coupled.

The unit 4 is of generally known type and includes four successive sections, development 73, fixing 74, washing 75, and drying 76 respectively, through which the film P is advanced by means of an electronically-controlled automatic conveyor module, generally indicated as 77. At the output of the drying section 76, the treated film is discharged into a collecting tray 78 located at the top of the unit 4.

It should be noted that the conveyor device 77 of the wet development unit 4 substantially constitutes a prolongation of the path of advance of the film in the handling and exposure unit 3, as defined by the belts 51 and the rollers 53,54,56,57. Therefore, the outlet 62 and the inlet 63 may be considered light-tight coupling and conveying means for the film from exposure module (20) of unit 3 to conveyor module 77 of unit 4.

The development, fixing and washing sections 73, 74, 75 are associated with respective hydraulic supply units 79, 80, 81 for supplying treatment liquids from suitable containers 82, 83, 84 which enable hydraulic connections between the unit and the exterior to be eliminated.

As explained previously, instead of having the "complete" configuration described so far, the apparatus according to the invention may have different partial configurations still within the scope of use with the magazine-loader M for the pack of films P. These partial configurations are illustrated in FIGS. 3 and 4 respectively, in which parts identical to or similar to those described previously are indicated by the same reference numerals.

In the case of the embodiment illustrated in FIG. 3, the apparatus comprises only the main unit 1 constituted by the base unit 2 and the handling and exposure unit 3, thus excluding the secondary wet development unit 4. Clearly, in this embodiment, in which the outlet 62 for the light-tight coupling to the unit 4 and the deflector device 161 are also omitted, only photosensitive films which can be dry-developed by means of the dry development module 21 may be used. The other partial configuration illustrated in FIG. 4 differs from the complete one of FIGS. 1 and 2 in the elimination of the dry development module 21, the outlet module 22 and the deflector device 161. This embodiment, therefore, can be used only with photosensitive films which can be wet-developed by means of the auxiliary unit 4.

It should be noted that the three configurations of the apparatus described above may also be used with a cassette container for a single photosensitive sheet instead of with a magazine-loader arranged to contain a plurality of photosensitive films. In this case, the only change in the apparatus, not illustrated in the drawings, would be the replacement of the reception module 17 for the magazine-loader M with a reception module for a single-sheet cassette, having an associated device for opening the cassette to allow the photosensitive sheet to be taken up by the take-up unit 18.

The same three configurations may be arranged to operate with a continuous strip of photosensitive film in a roll instead of with discrete sheets of photosensitive film. FIGS. 8 and 9 show exactly this possibility, with reference to the "complete" configuration in which, for simplicity of representation, the auxiliary wet treatment unit 4 has been omitted.

In this embodiment, the base unit 2 and the exposure module 20, as well as the dry development module 21 of the handling and exposure unit 3, are entirely similar to those described previously. The receiving module for the photosensitive film with the take-up unit and the conveyor module for conveying the film to the exposure module 20 are different, however. In effect, the receiving module, indicated as 117, is constituted by a simple receptacle 118 for receiving a package in the form of a parallelepipedal box E constituting the package within which a roll W of radiographic paper is inserted in a light-tight manner so as to be able to unwind downwardly. Access to the receptacle 118 is allowed through an openable door, not illustrated, formed in one of the side panels 10 of the unit 3.

The take-up unit in this case coincides with the conveyor module for the film F, indicated 119. It includes a pair of superimposed rollers 120, 121 of which the first is motor-driven and the second acts as a pressure roller and is forced against the roller 120 by the action of a pin spring 122. The roller 119 is supported through a free-wheel 123 by a shaft 124 whose ends are operatively associated with a brake and an electromechanical friction clutch, of which only the second is shown schematically at 125 in FIG. 9. The shaft 124 can be coupled through this friction clutch for rotation by an electric motor, indicated schematically as 126, following the deactivation of the brake.

Immediately downstream of the conveyor module 119 is a cutting unit, generally indicated 127, including a rotary blade 128 operated by means of the motor 126 and a fixed counter-blade 129. From the cutting unit 127 film passes through a conveyor member 130 to the exposure module 20. As stated, this module 20 is entirely similar to that described previously with the sole variation being the presence of a pair of feeler members, schematically indicated 131 and 132 respectively, located in the path of advance of the film L along the horizontal conveyor passes of the two belts 51. The feelers 131 and 132 are driven by the film strip F during its advance and are connected to the electronic microprocessor control unit of the unit 3. These feelers 131 and 132 have the respective functions of determining the length of the portion of film F which must be cut by the cutting unit 127 and of positioning this length of film F correctly in correspondence with the exposure module 20 in the manner explained below.

In operation, the film F is unwound from the roll W by the rotation of the shaft 124 which is transmitted to the roller 123 through the free-wheel 125 in the sense corresponding to the advance of the film towards the exposure module 20. The film strip is then advanced through this module 20 by means of the belts 51 until it reaches the feeler 131. The activation of this feeler by the film causes the deactivation of the friction clutch 125 and the activation of the brake associated with the shaft 124. This causes the stoppage of the film F upstream of the rollers 120 and 121, while the exposure module 20 continues to draw the film F to put it under tension. Simultaneously, the cutting unit 127 is activated and, as a result of the rotation of the rotary blade 128, cuts the film F so that a piece of predetermined length is obtained in the exposure module 20. This piece is advanced still further until it contacts the feeler 132 whereby the drive members of the module 20 are deactivated and the piece of film F is stopped against the perforated plate 52 under the action of the suction generated within the chamber 61 by the suction section of the aspirator-compressor unit 52.

After the film has been exposed to the video image generated by the television monitor 14, the piece of film is transferred to the deflector 161 and by this to the dry development module 21 or to the wet development module 4 through the outlet 62.

In the first case, the developed film is finally fed to the collecting tray 72 through the output module 22 which in this instance is constituted simply by a final motor driven roller 71.

It will be clear from the above that the apparatus according to the invention is highly flexible in realization and hence in use because of its modular form. The various forms of embodiment described above for the handling and exposure unit 3 are perfectly interchangeable, the connection with the base unit 2 being achievable in an extremely practical, convenient and easy manner without any adaptation or modification of the latter.

Naturally, the constructional details and forms of embodiment of the invention may be varied widely with respect to those described and illustrated, without thereby departing from the scope of the claims which follow.

We claim:

1. Apparatus for the transfer in daylight of a video image onto a discrete or continuous sheet of photosensitive film contained in a loading unit, comprising televisual display means, means for receiving and handling the photosensitive film, means defining an exposure station for exposure of the photosensitive film by the televisual display means, and conveyor means for transferring the photosensitive film from the receiving and handling means to the exposure station, characterized in that it includes:

(a) a base unit (2) containing the televisual display means (14) and having an open upper wall (5) through which the video image to be transferred onto the photosensitive film (P,F) is projected towards a horizontal focal plane (52) of exposure,
   (b) a handling and exposure unit (3) applied to the upper open wall (5) of the base unit (2) with a light-tight seal and carrying the receiving (17;117) and handling (18;119) means an exposure module (20) and the conveyor means (19;119), the base unit (2) and the handling and exposure unit (3) being shaped essentially as open parallelepipeds and constituting two structurally distinct units which are independent of each other and connected together in a horizontal plane (5,6),
   (c) first peripheral abutment means (11) associated with the units (2,3) in correspondence with the respective outer lateral surfaces in the zone of the horizontal plane (5,6) of connection,
   (d) front, rear and side outer panel members (9,10) provided with second abutment means (9a, 10a), the light-tight combination of said first and second abutment means (11,9a, 10a), associated with said panel members, providing light protecting means for the two units (2,3).

2. Apparatus according to claim 1, characterized in that the first abutment means comprise a channel-profiled peripheral member (11) having its channel facing outwardly and defining two horizontal abutment edges, upper and lower (12,13) respectively, defining the horizontal plane (5,6) of connection between the two units (2,3), and the outer panel members (9,10) include horizontal engagement edges (9a,10a) for complementary engagement in the channel of the channel-profiled member (11).

3. Apparatus according to claim 1, characterized in that the handling and exposure unit (3) comprises:
   a receiving module (17;117) for the photosensitive film (P,F), including a film take-up unit (18;119),
   a film conveyor module (19;119),
   a film exposure module (20) including a horizontal exposure plane (52) facing the base unit (2) and supplied by the conveyor module (19;119), the exposure plane (52) defining the focal plane, and vacuum means (61,32) for retaining the film in the exposure plane.

4. Apparatus according to claim 3, characterized in that the handling and exposure unit (3) incorporates a dry development module (21) for developing the exposed film, which is fed from the exposure module (20), and a module (22) for discharging the developed film from the handling and exposure unit (3), which is operatively associated with the dry development module (21).

5. Apparatus according to claim 1, characterized in that it further includes a wet development structural unit (4) for developing the exposed photosensitive film, which is light-tight coupled to the side of the handling and exposure unit (3) and is fed from the exposure module (20).

6. Apparatus according to claim 4, characterized in that it further includes a wet development structural unit (4) for the photosensitive film, which is light-tight coupled to the side of the handling and exposure unit (3) and is fed from the exposure module (20).

7. Apparatus according to claim 5, characterized in that the handling and exposure unit (3) and the wet development unit (4) have respective light-tight coupling and conveying means (62,63) for the film from the exposure module (20) of the handling and exposure unit (3) to a conveyor module (77) of the wet development unit (4).

8. Apparatus according to claim 7 as dependent from claim 6, characterized in that the exposure module (20) of the handling and exposure unit (3) has associated deflector means (161) for directing the exposed film selectively towards the dry development module (21) of the exposure and handling unit (3) or towards the conveyor module (77) of the wet development unit (4) respectively.

9. Apparatus according to claim 4, characterized in that it includes an electronic processing and control unit with a microprocessor for controlling the operation of the take-up unit (18;119), the conveyor module (19;119), the exposure module (20), the televisual display unit (14), the dry development module (21) with its discharge module (22) and/or the wet development unit (4) in predetermined operative cycles.

10. Apparatus according to claim 6, characterized in that the handling and exposure unit (3) an the wet development unit (4) have respective light-tight coupling and conveying means (62, 63) for the film from the exposure module (20) of the handling and exposure unit(3) to a conveyor module (77) of the wet development unit (4).

11. Apparatus according to claim 6, characterized in that it includes an electronic processing and control unit with a microprocessor for controlling the operation of the take-up unit (18;119), the conveyor module (19;119), the exposure module (20), the televisual display unit (14), the dry development module (21) with its discharge module (22) and/or the wet development unit (4) in predetermined operative cycles.

* * * * *